(12) United States Patent
Wong

(10) Patent No.: US 9,204,758 B2
(45) Date of Patent: Dec. 8, 2015

(54) PORTABLE FOOD PROCESSOR

(76) Inventor: Yan Kwong Wong, Kowloon (HK)

(*) Notice: Subject to any disclaimer, the term of this patent is extended or adjusted under 35 U.S.C. 154(b) by 146 days.

(21) Appl. No.: 14/002,841

(22) PCT Filed: Mar. 2, 2012

(86) PCT No.: PCT/IB2012/051002
§ 371 (c)(1),
(2), (4) Date: Sep. 3, 2013

(87) PCT Pub. No.: WO2012/120425
PCT Pub. Date: Sep. 13, 2013

(65) Prior Publication Data
US 2013/0334350 A1    Dec. 19, 2013

(30) Foreign Application Priority Data

Mar. 4, 2011   (HK) .................................. 11102214

(51) Int. Cl.
*A47J 43/08*       (2006.01)
*A47J 43/044*      (2006.01)
*A47J 43/24*       (2006.01)

(52) U.S. Cl.
CPC .............. *A47J 43/082* (2013.01); *A47J 43/044* (2013.01); *A47J 43/24* (2013.01); *A47J 43/08* (2013.01)

(58) Field of Classification Search
CPC ....... A47J 43/105; A47J 43/08; A47J 43/082; A47J 43/044; A47J 43/10; A47J 43/1025; A47J 43/085; A47J 43/046
USPC .................................. 241/168, 169.1, 101.2
See application file for complete search history.

(56) References Cited

U.S. PATENT DOCUMENTS

| | | | | |
|---|---|---|---|---|
| 5,064,535 A * | 11/1991 | Hsu ............................ 210/380.1 |
| 5,156,084 A | 10/1992 | Lin |
| 5,735,193 A * | 4/1998 | Chang ............................. 99/494 |
| 6,035,771 A | 3/2000 | Conran et al. |
| 7,681,495 B2 * | 3/2010 | Wan et al. ....................... 99/495 |
| 7,762,487 B2 * | 7/2010 | Cheung ....................... 241/169.1 |
| 2004/0159727 A1 * | 8/2004 | Mueller ..................... 241/169.1 |
| 2009/0045274 A1 * | 2/2009 | So et al. ..................... 241/169.1 |
| 2009/0178580 A1 * | 7/2009 | Herren ............................ 99/510 |

FOREIGN PATENT DOCUMENTS

| | | |
|---|---|---|
| CN | 1985733 A | 6/2007 |
| CN | 201641717 U | 11/2010 |

(Continued)

*Primary Examiner* — Faye Francis
(74) *Attorney, Agent, or Firm* — Gloria Tsui-Yip, Esq.; Miskin & Tsui-Yip LLP

(57) ABSTRACT

A portable food processor includes a container for containing food, a food processing component and a container cover component. The food processing component is arranged inside the container and rotates relative to the container. The container cover component is fixed to cover an opening of the container and includes a cover body, a driving component arranged in the top of the cover body and a transmission mechanism arranged in the cover body. The driving component drives the food processing component to rotate relative to the container through the transmission mechanism. The driving component is a pull rod component which includes a chute arranged in the top of the cover body and a pull rod arranged in the chute. The pull rod is provided with a rack to mesh with a gear of the transmission mechanism. The pull rod is pulled in a reciprocating manner to operate.

17 Claims, 18 Drawing Sheets

(56) References Cited

FOREIGN PATENT DOCUMENTS

| CN | 201755147 U | 3/2011 |
| CN | 102133055 A | 7/2011 |
| CN | 103004910 B * | 9/2014 |

* cited by examiner

PORTABLE FOOD PROCESSOR

TECHNICAL FIELD

The present invention relates to a kitchen appliance, more specifically, the present invention relates to a portable food processor.

BACKGROUND ART

Of the various kitchen appliances, the food processor is the most versatile, often used for chopping fruits, vegetables, and other food items into smaller pieces for eating or as ingredients for other uses. There are currently many food processors in the market today, most of them utilizing a hand knob that rotates the shaft with blades attached. The spinning blades then chop up the food. However, the structure of these food processors tends to be more complex, especially when a higher drive ratio is required, resulting in an increase in the size of the knob in the center of the cover, making it more difficult to manufacture and assemble. Furthermore, the food in said food processor encounters less resistance, leading to lower chopping efficiency. The hand turning of the knob requires more effort to operate.

SUMMARY OF THE INVENTION

The technical problem to be solved in the present invention is to focus on the problem of operating inconveniently of the existing technology in order to provide a portable food processor with convenient operation.

The present invention solves the related existing technical problem by applying the technical method of: constructing a portable food processor, comprising a container for receiving food, a food processing member being mounted inside the said container adapted to be rotated relative to the said container and a container cover member covered and mounted to an aperture of the said container, the said container cover member comprises a cover, a driving member mounted on the top of the said cover and a transmission device being mounted inside the said cover, the said transmission device is adapted to be driven by the said driving member and then drive the said food processing member be rotated relative to the said container, wherein the said driving member is a pull rod member, the pull rod member comprises a sliding track arranged at the top of the said cover and the said pull rod being mounted inside the said sliding track, the said pull rod comprises a gear rack which is adapted to mesh with gear and gear rack of the said transmission device.

According to the above portable food processor of the present invention, a handle is rotationally mounted to an end of the said pull rod, the said handle and the said pull rod are rotationally mounted together through a shaft.

According to the above portable food processor of the present invention, the said handle lying on a same plane with the direction of sliding movement of the said pull rod is arranged in a position vertically to the direction of sliding movement of the said pull rod.

According to the above portable food processor of the present invention, an elastic member adapted for being elongated when pulling and returned to its original position when relaxing is mounted between another end of the said pull rod and the said cover.

According to the above portable food processor of the present invention, the said handle is T-shaped, the said T-shaped handle comprises the upper handle shell and the lower handle shell which are mounted together, a pair of corresponding convex element and concave element are arranged between the said upper handle shell, the said lower handle shell and the said pull rod.

According to the above portable food processor of the present invention, the said pull rod further comprises a connecting rod, the said handle is rotationally mounted to a D-shaped handle of the said connecting rod.

According to the above portable food processor of the present invention, first and second positioning rods are mounted inside the said cover, the said driving gear member is mounted on the said first positioning rod; the said driven gear member is mounted on the said second positioning rod; the said driven shaft is rotationally mounted to the center portion of the said cover; the said driving gear member adapted for being rotationally mounted within the said cover is meshed with the said gear rack and the said driven gear member respectively; the said driven gear member adapted for being rotationally mounted inside the said cover is meshed with the said driving gear member and the said driven shaft gear member which is mounted to an upper end of the said driven shaft respectively; the said driven shaft is extended from a bottom portion of the said container cover member by passing through a shaft hole and is drivingly mounted to the said food processing member.

According to the above portable food processor of the present invention, the said driving gear member comprises an upper transmission gear adapted to be meshed with the said gear rack of the said pull rod and a lower transmission gear adapted to be meshed with the said driven gear member, the said upper transmission gear and the said lower transmission gear are both mounted on the said first positioning rod and rotated coaxially.

According to the above portable food processor of the present invention, the said clutch is arranged between the said upper transmission gear and the said lower transmission gear, the said clutch comprises a pawl adapted for being rotated coaxially with the said upper transmission gear is mounted on an end surface of the said upper transmission gear, a ratchet groove is mounted to an end surface of the said lower transmission gear, a toggle wheel adapted for being engaged or disengaged from the said ratchet groove by toggling the said pawl is coaxially mounted to the said upper transmission gear.

According to the above portable food processor of the present invention, the said toggle wheel and the said upper transmission gear are coaxially mounted, corresponding convex element and curved concave element are arranged between the said toggle wheel and the said upper transmission gear, the said pawl and the said ratchet groove are adapted to be engaged or disengaged through sliding movement of the said convex element along the said curved concave element.

According to the above portable food processor of the present invention, the said driven shaft comprises a clump weight adapted to be rotated coaxially with the said driven shaft.

According to the above portable food processor of the present invention, the said food processing member is a strainer basket member comprising a strainer basket cover coaxially rotationally mounted to the lower end of the said driven shaft and a strainer basket rotationally positioned within the said strainer basket, the said strainer basket cover is attached on the aperture of the said strainer basket.

According to the above portable food processor of the present invention, the said food processing member comprises a center shaft arranged in the said container and a working member mounted to the said center shaft, the lower end of the said center shaft is rotationally mounted to the bottom of the said container, the upper end of the said center shaft is being coaxially rotated which is driven by the said driven shaft.

According to the above portable food processor of the present invention, the said center shaft comprises at least one connecting plate mounted to the outer wall of the said center shaft, the said working member is a blade mounted to the said connecting plate.

According to the above portable food processor of the present invention, the said working member is at least one blade adapted for mixing food and is mounted to the outer wall of the said center shaft.

According to the above portable food processor of the present invention, the inner wall of the said container comprises at least one first convex element adapted for increasing the friction between the food and the said food processing member extended from the top of the said container towards the bottom of the said container.

According to the above portable food processor of the present invention, the said container further comprises at least one concave region adapted for being held by the user mounted to the outer wall of the said container.

To implement the portable food processor of the present invention, the advantages are as follows: since the pull rod member is used as the driving member, only the pull rod needs to be pulled in a reciprocating manner when the portable food processor is operated. Compared with the operation mode of rotating a knob in the prior art, the portable food processor is more convenient and the transmission ratio during driving can be increased by providing a longer pull rod.

Further, to improve the cutting efficiency, it is possible to add the first convex element on the inner surface of the container to increase the friction between the blade and the food.

BRIEF DESCRIPTION OF THE DRAWINGS

The followings combines the drawings and embodiments to further explain this invention, the drawings are as follows:

FIG. 5b shows a bottom up exploded view of the clutch of FIG. 5a;

DESCRIPTION OF EMBODIMENTS

Figure 1:
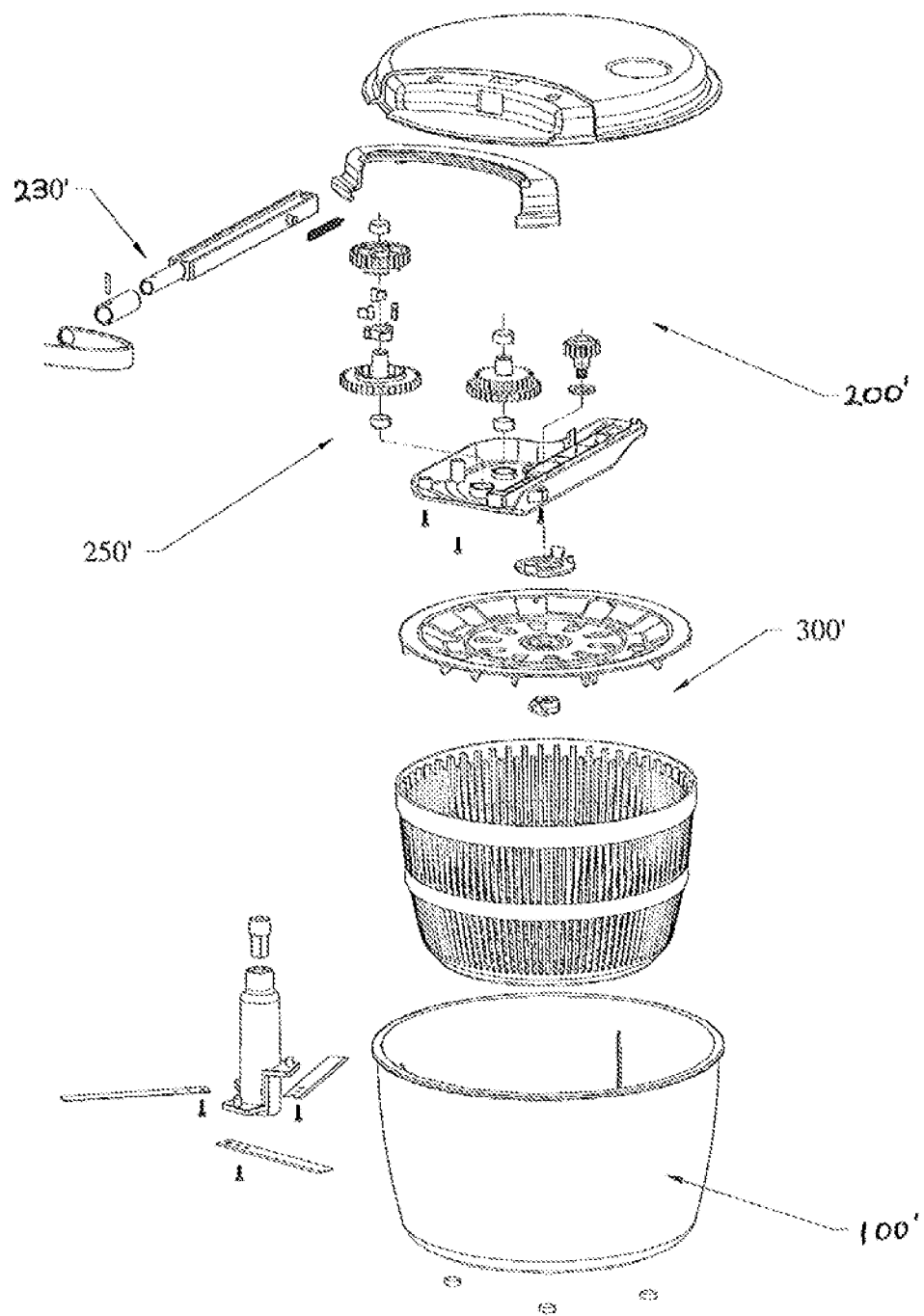
FIG. 1 shows an exploded view of the first embodiment of the said portable food processor of the present invention.

As shown in FIG. 1, referring to the first embodiment of the portable food processor of the present invention, the portable food processor comprises the container 100', container cover member 200' and the food processing member 300 within the container 100'. The container cover member 200' comprises the cover that closes the aperture of the container 100', the pull rod member 230' that protrudes on top of the cover, and the transmission device 250' that is arranged in the cover. The pull rod member 230' rotates the food processor member 300 relative to the container 100'. The spinning of the food processing member 300 relative to the container 100' allows the draining, cutting up or mixing of the food.

Figure 2:
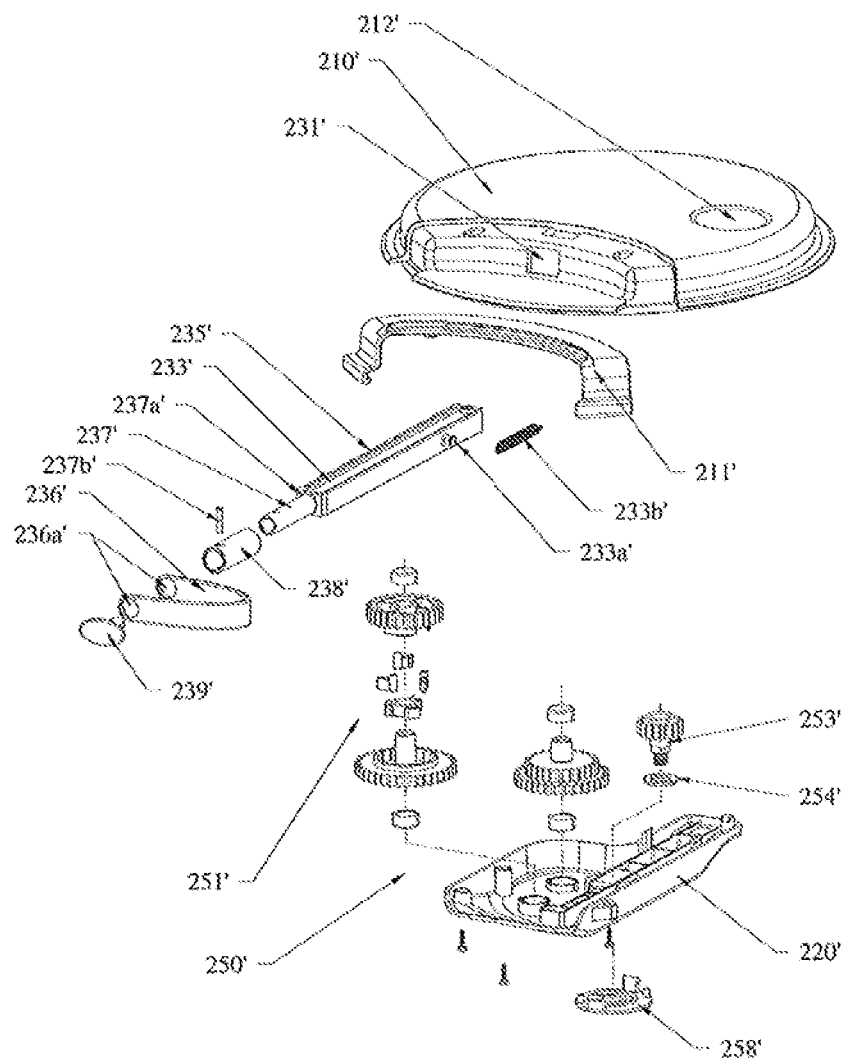
FIG. 2 shows an exploded view of the cover member of the first embodiment of the said portable food processor of the present invention.
Figure 2A:
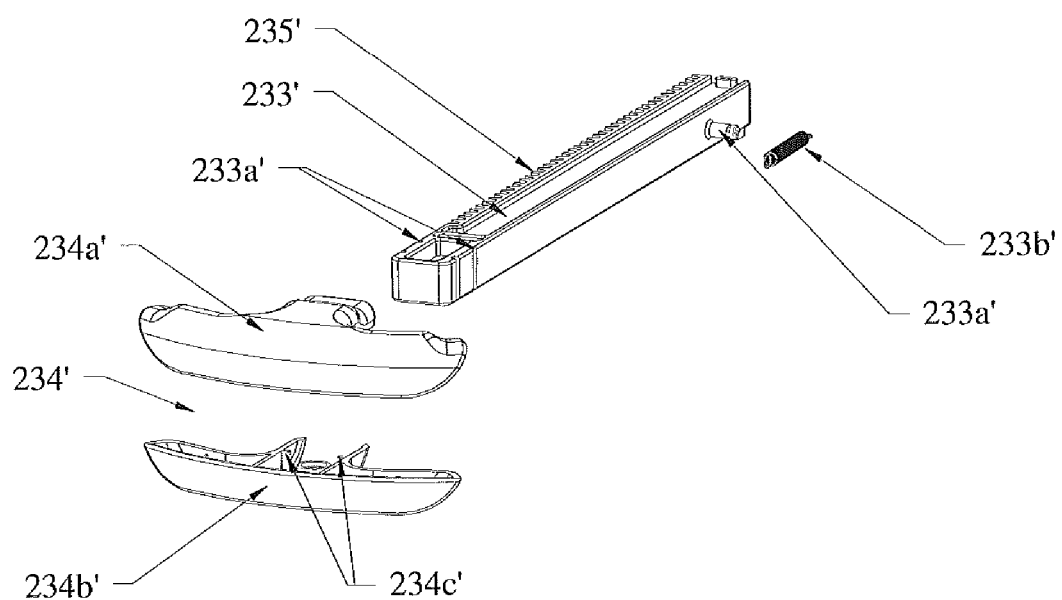
FIG. 2a shows an alternative structural view of the pull rod in the cover member of the first embodiment of the said portable food processor of the present invention.

As shown in FIG. 2, 2a, in this embodiment, the cover is assembled from the upper shell 210' and the lower shell 220'. The upper shell 210' and the lower shell 220' are securely attached together by screws or equivalent fasteners, and the cavity between the upper shell 210' and the lower shell 220' is where the transmission device 250' can then be placed. The lower shell 220' fits onto the aperture of the container 100', so that lower shell 220' covers the aperture of the container 100'. The pull rod member comprises the sliding track 231' and the pull rod 233' within the sliding track 231' that is between the upper shell 210' and the lower shell 220'. The pull rod 233' fits into the sliding track 231', so that the pull rod 233' can slide back and forth on a level plane.

Preferably, a handle is mounted to an end of the pull rod 233', an elastic member adapted for allowing it to be pulled and be extended is mounted to an other end of the pull rod 233'. In this embodiment, the elastic member is a spring 233b'. An end of the spring is mounted to the convex member 233a' on the pull rod and the other end of the spring is mounted to the upper shell 210'. By using the handle to pull the pull rod 233' out of the sliding track 231', the spring 233b' will return the pull rod 233' back into the sliding track 231', so it is easy to operate.

As shown in FIG. 2, the handle 236' can be of D-shape, there is a connecting rod 237' which connects the handle and the pull rod 233'. The connecting region between the connecting rod 237' and the pull rod forms a step 237a', there is sleeve connector 238' is arranged on the connecting rod 237', an end cap 239' is arranged at the end of the connecting rod 237'.

There is a positioning rod 237b' arranged at the end portion of the connecting rod 237' that passes through the connecting rod 237', the sleeve connector 238', and the end cap 239; so that the end cap 239', sleeve connector 238', and the connecting rod 237' are securely connected in position. There are sleeve apertures 236a' at both ends of the D shape handle. One side of the D shape handle is fixed in position between the step 237a' and the sleeve connector 238', and the other end is fixed in position between the sleeve connector 238 and the end cap 239, so that the D shape handle is formed by the sleeve connector 238' set between the two ends. This secures the D shape handle in position at the end of the pull rod 233', and ensures that the D handle 236' can rotate on the axis of the connecting rod 237'. When in use, the hand would hold onto the D shape handle 236' to move the pull rod 233' in reciprocating movement conveniently. One of the side edges of the pull rod 233' has a gear rack 235', to mesh with the gear in the transmission device 250', so that the pull rod 233' drives the transmission device 250' that in turn rotates the food processing member 300.

As shown in FIG. 2a, the handle 234' can be T shape. The T shape handle 234' comprises a top handle shell 234a' and the lower handle shell 234b', there are convex element 234c' on the upper handle shell 234a' and lower handle shell 234b' and the groove 233a' on the end of the pull rod 233'. By allowing the upper and lower handle shell 234a', 234b' to secure in position at the end of pull rod 233', the T shape handle 234' is therefore mounted at the end of the pull rod 233'. When in use, the hand would hold onto the T shape handle 234' to move the pull rod 233' in reciprocating movement conveniently. An improvement would be to include a concave region 211' on the cover at the end of the sliding track 231' (the pull rod end that is closest to the T shape handle), the concave region 211' and the T shape handle 234' corresponds; when the pull rod 233' slides into the sliding track 231', the T shape handle 234' fits into concave region 211', so that the cover appears uniform in shape. The handle at the end of the pull rod can be other shapes as desired.

Figure 4:
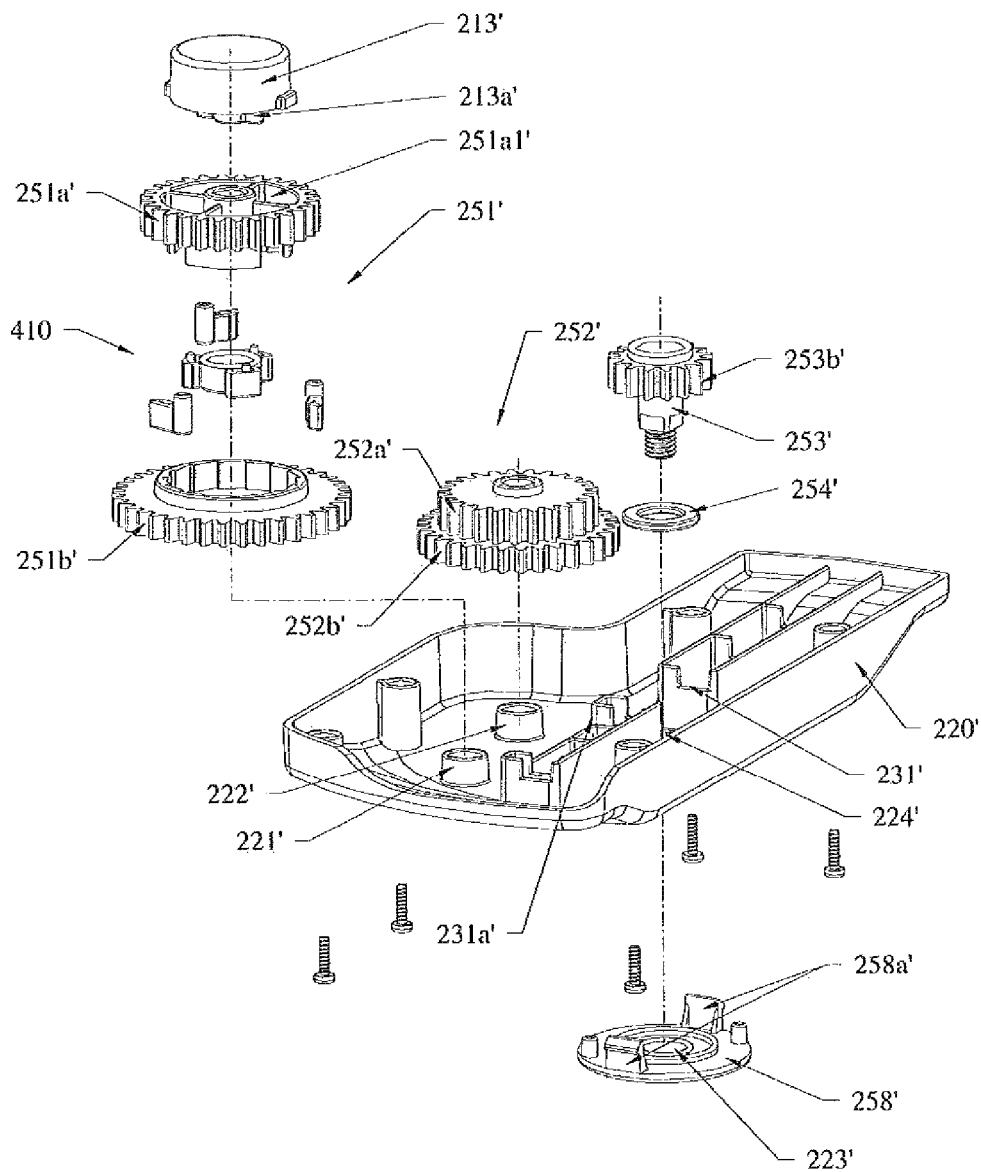
FIG. 4 shows an exploded view of the transmission device of the first embodiment of the said portable food processor of the present invention.
Figure 5A:
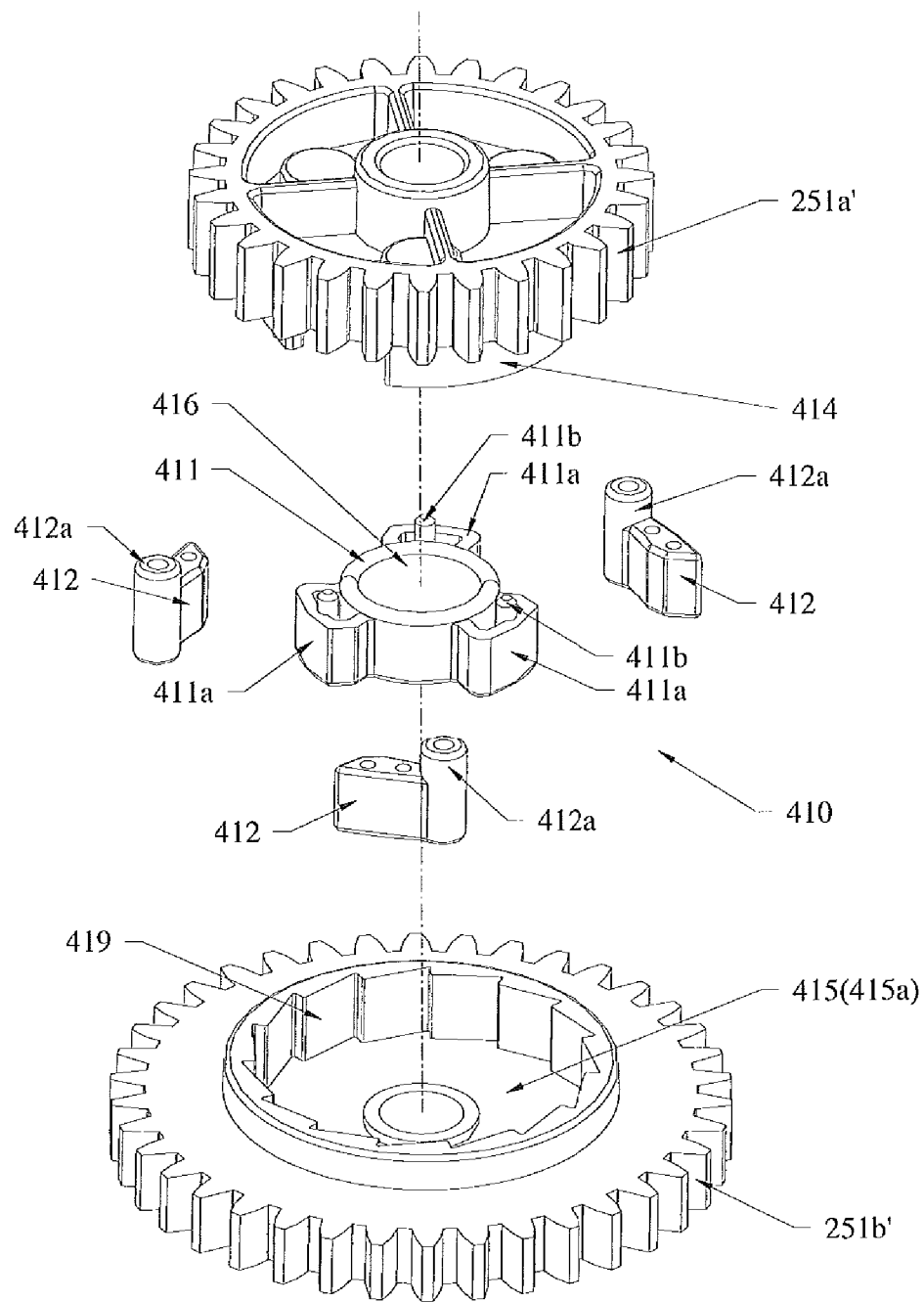
FIG. 5a shows an exploded view of the clutch of the first embodiment of the said portable food processor of the present invention.
Figure 5B:
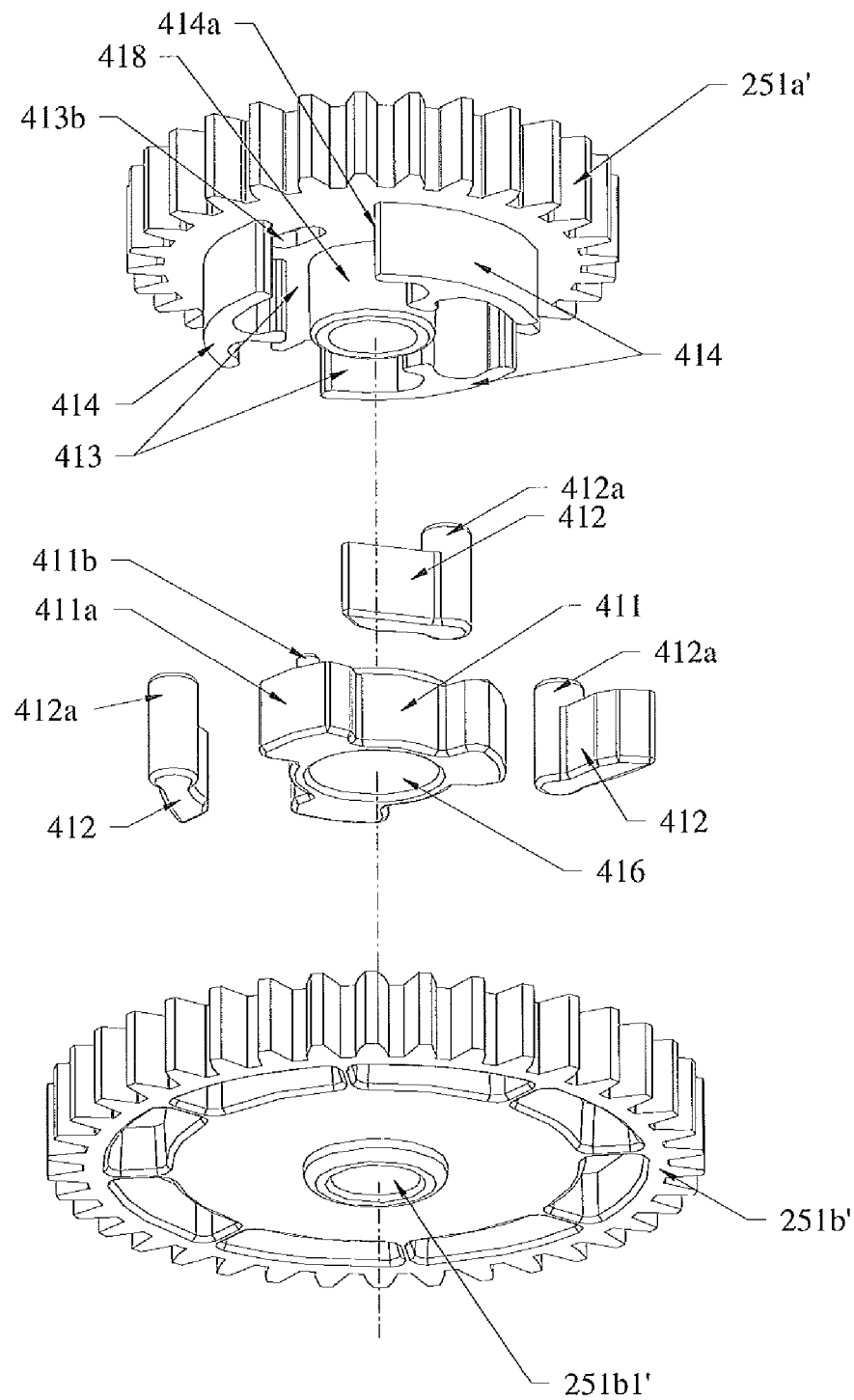

As shown in FIGS. 2 and 4, the transmission device 250' comprises the driving gear member 251', the driven gear member 252', and the driven shaft 253'. In particular, there is a first positioning rod 221' located on the top and near the side of the lower shell 220' close to the edge of the upper shell, there is an aperture 212' located on the upper shell 210' corresponding to the positioning rod 221'. The driving gear member 251' comprises a positioning knob 213', the upper transmission gear 251a' and the lower transmission gear 251b' which are able to be rotated coaxially. More specifically, the positioning knob 213' goes through the aperture 212' and extends above the upper shell 210; the lower portion of the positioning knob 213' has a larger circumference than the aperture 212'. Furthermore, the positioning knob 213' has a convex element 213a' at the bottom of the positioning knob 213', there is an aperture 251a1' adapted to be corresponded to the convex element 213a' being arranged at the top end surface of the upper transmission gear 251a' near the center shaft position, there is an aperture 251b1' adapted to be corresponded to the first positioning rod 221' being arranged at the bottom end surface of the lower transmission gear 251b' near the center shaft position (see FIG. 5b). By arranging the appropriate shaft's dimension, upper and lower transmission gears 251a', 251b' are able to be rotated coaxially and can be fixed in position on top of first positioning rod 221' and through the aperture 212' in the upper shell with the positioning knob 213', thereby positioning the driving gear member 251' on the first positioning rod 221'. The upper transmission gear 251a' meshes with the gear rack 235' on the side of the pull rod, the lower transmission gear 251b' meshes with the driven gear member 252'. If it is required by the user, the first positioning rod 221' can be arranged on the top of the upper shell 221', and correspondingly the driving gear member 251' can be set on the first positioning rod 221', so that the pull rod 233' can rotate the first positioning rod 221' by moving the driving gear member 251'.

In this embodiment, there is a second positioning rod 222' arranged on the top and near the side of the lower shell 220' close to the edge of upper shell 210'. One can arrange a screw hole in the middle of the driven gear member 252', so that the driven gear member 252' can be fixed in position on the top and close to the edge of the lower shell 220', which means the driven gear member 252' sits in the cavity between the upper and lower shells 210', 220'. The driven gear member 252' comprises the upper driven gear 252a' and the lower driven gear 252b' which are able to be rotated coaxially, the upper driven gear 252a' meshes with the lower transmission gear 251b', and the lower driven gear 252b' meshes with the driven shaft gear members 253b' on the driven shaft 253'. Similarly, if it is required by the user, the second positioning rod 222' can be arranged on top of upper shell 221', and then the driven gear member 252' is arranged on the second positioning rod 222'; or one can use the same positioning method as driving gear member to arrange the driven gear member 252' onto the second positioning rod 222'.

As shown in FIG. 4, inside the sliding track 231' which is formed by the upper shell and lower shell 210' 220', there is an aperture 231a' on the wall of the sliding track. The upper transmission gear 251a' is arranged between upper and lower shells 210', 220' through the aperture 231a' and meshes with the gear rack 235' on the side of the pull rod inside the sliding track 231'. When the pull rod 233' is moved, the gear rack 235' on the side of the pull rod 233' meshes with the upper transmission gear 251a' of the driving gear member, in turn rotating the driving gear member; the lower transmission gear 251b' of the driving gear member meshes with the upper driven gear 252b' of the driven gear member, in turn rotating the driven gear member 252; the lower driven gear 252b' of the driven gear member meshes with the driven gear 253b' on the top of the driven shaft, in turn rotating the driven shaft 253, thereby rotating the food processing member 300.

To ensure the driven shaft 253' only rotates in one direction when the pull rod 233' is moved back and forth, it is preferable to install a clutch 410 in the transmission device. In this embodiment, the clutch 410 is installed in the driving gear member 251'. Specifically, as shown in FIGS. 5a, 5b, 6a, 6b, and 6c, the clutch 410 includes the toggle wheel 411 and the pawl 412. In order to arrange the toggle wheel 411 and the pawl 412 in position in between the upper transmission gear 251a' and the lower transmission gear 251b', there is a housing between the upper and lower transmission gears 251a', 251b'. In which the toggle wheel 411 and the pawl 412 are both arranged inside the housing. In this embodiment, there are three pawls but there can be one, or two, or more as needed.

Specifically, in this embodiment, there is a ring shape convex element 414 on the bottom end of the upper transmission gear and a concave region 415 on the top of the lower transmission gear. When the ring shape convex element 414 and the concave region 415 couple together, it forms the housing for the toggle wheel 411 and the pawl 412. There are toggle pieces 411a around the toggle wheel and a center hole 416 in the middle. In this embodiment there are 3 toggle elements 411a evenly distribute circumferentially around the toggle wheel 411. There is a position limiting concave region 413 inside the ring shape convex element 414 that is shaped around the toggle wheel 411; in the center of the position limiting concave region 413, there is a positioning rod 418 which corresponds to the center aperture 416. When the center aperture 416 is arranged on the positioning rod 418, the toggle wheel 411 can rotate axially around the positioning post in a set direction.

The concave region 415 of the lower transmission gear is of a ring shape; there are teeth 419 in the curved walls of the concave region 415 forming the ratchet groove 415a. There is an aperture 414a in the ring shape convex element 414 of the upper transmission gear; this allows the pawl 412 to extend out from the position limiting concave region to connect with the teeth 419. There is a positioning aperture 413a on the bottom of the position limiting concave region 413 which matches up with the shaft 412a that stands up on the top of pawl 412 (see FIG. 6c), positioning the pawl 412 within the position limiting concave region 413; there are convex elements 411b at the end of the point of contact between each of the toggle elements 411a of the toggle wheel and the position limiting concave region. The bottom of the position limiting concave region has a corresponding curved concave element 413b to the convex element 411b, which rotates around the toggle wheel axis along the curved concave element for a certain angle of rotation. The degree of angle is determined by the size of the curvature of the curved concave element 413b.

Figure 6A:
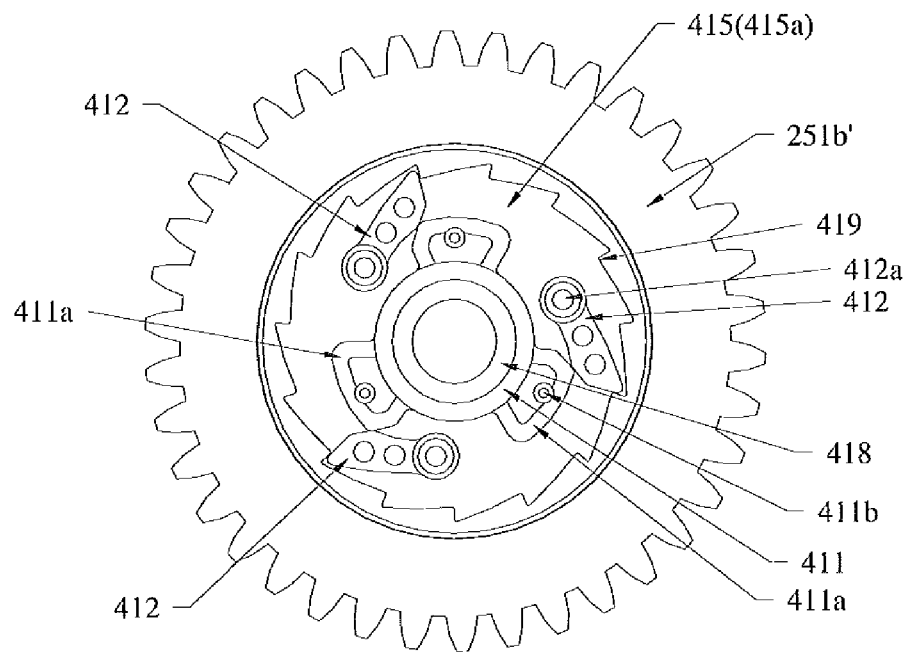
FIG. 6a shows a structural view of the lower transmission gear of the first embodiment of the said portable food processor of the present invention when the clutch is engaged.
Figure 6B:
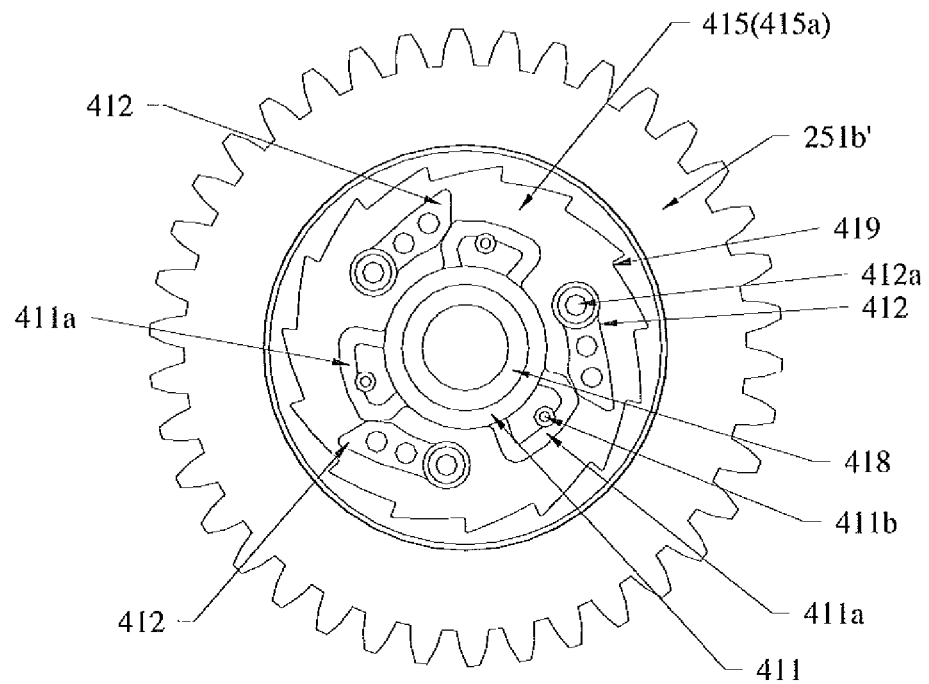
FIG. 6b shows a structural view of the lower transmission gear of the first embodiment of the said portable food processor of the present invention when the clutch is disengaged.
Figure 6C:
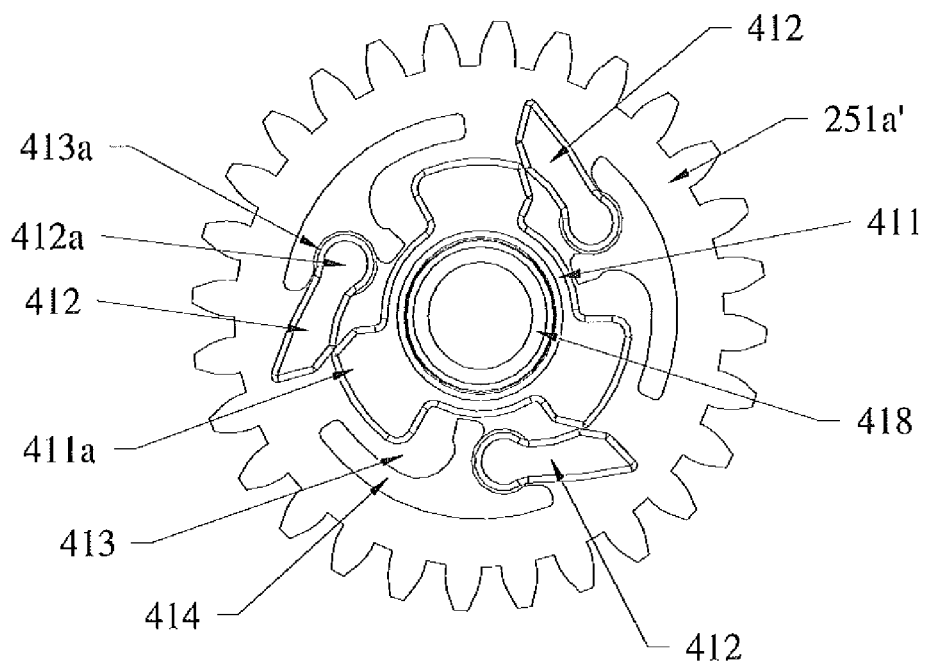
FIG. 6c shows a structural view of the upper transmission gear of the first embodiment of the said portable food processor of the present invention when the clutch is engaged.

As shown in FIGS. 6a and 6c, when the upper transmission gear 251a' rotates, the upper transmission gear 251a' rotates coaxially with the pawl shaft 412a as it corresponds with the position hole 413a of the limiting groove, so that the pawl shaft 412a moves towards the toggle elements 411a of the toggle wheel. At this time the convex element 411b of the toggle wheel will be stationary but the curved concave element 413b at the bottom of the position limiting concave region and upper transmission gear will rotate coaxially with the upper transmission gear 251a'. That is the curved concave element 413b will slide with respect to convex element 411b, causing the distance between the convex element 411b and the pawl shaft 412b to decrease. The toggle element 411a will drive the pawl 412 to rotate around the pawl shaft 412a, hence pushing the pawl 412 towards the outer edge of the convex element 414, causing the pawl 412 to catch with the teeth 419 in the concave region, driving the lower transmission gear 251b' to rotate. At this time, the clutch is in the engaged position, with the upper transmission gear 251a' rotating in sync with the lower transmission gear 251b'.

Figure 6D:
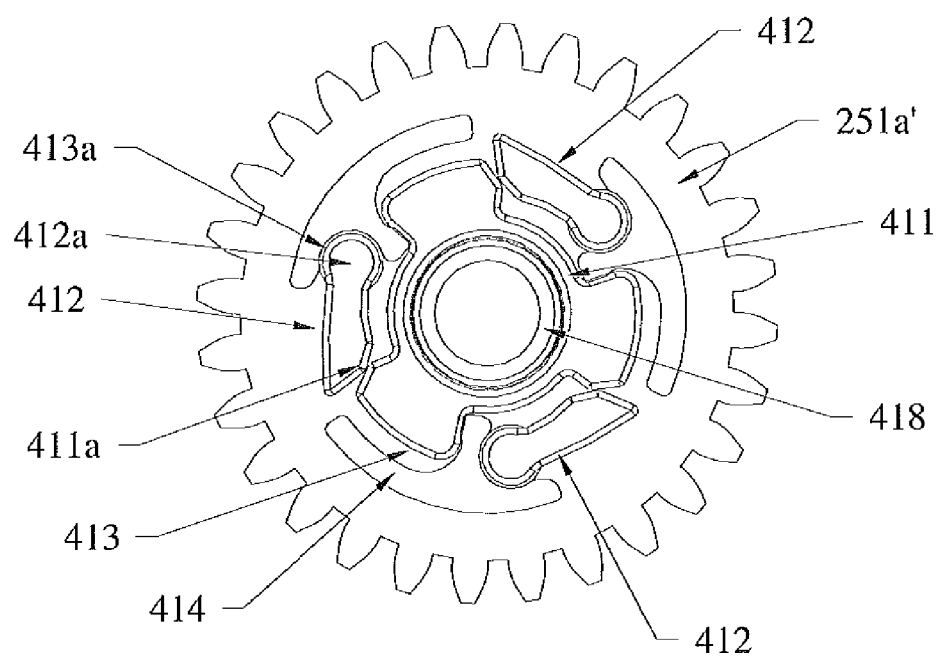
FIG. 6d shows a structural view of the upper transmission gear of the first embodiment of the said portable food processor of present invention when the clutch is disengaged.
Figure 7:
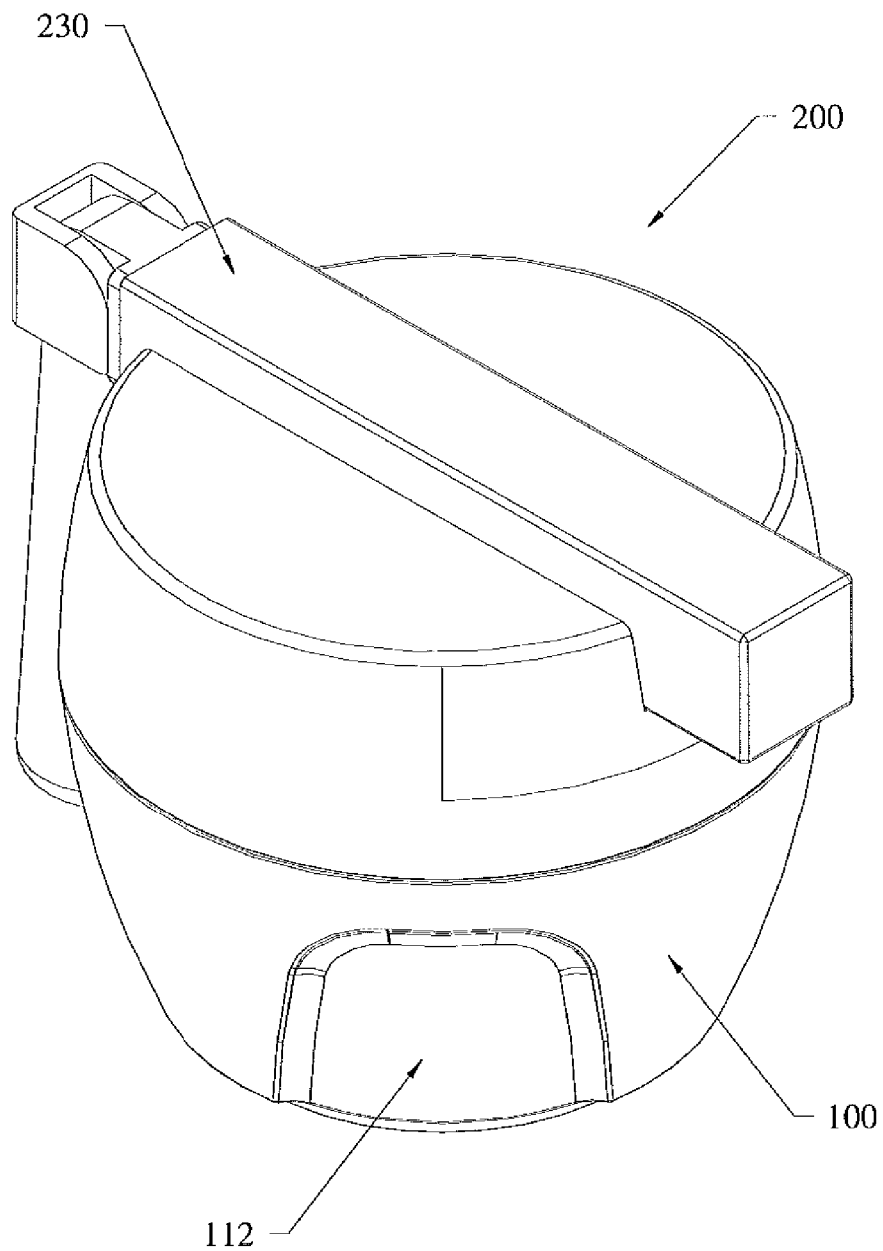
FIG. 7 shows a structural view of the complete structure of the second embodiment of said portable food processor of the present invention.

As shown in FIGS. 6b and 6d, when the upper transmission gears 251a' rotates in reverse direction, the upper transmission gear 251a' rotates in reverse direction with the pawl shaft 412a as it corresponds with the position hole 413a of the position limiting concave region, so that the pawl shaft 412a moves away from the toggle element 411a of the toggle wheel. At this time the convex element 411b of the toggle wheel will be stationary but the curved concave element 413b at the bottom of the position limiting concave region and upper transmission gear will rotate in reverse with the upper transmission gear 251a'. That is, the curved concave element 413b will slide in reverse to convex element 411b, causing the distance between the convex element 411b and the pawl shaft 412b to increase, the toggle element 411a separates from the pawl 412, the teeth 419 in the concave region drives the pawl 412 to rotate in reverse around the pawl shaft 412a, so that the pawl 412 separates from the teeth 419. At this time, the clutch is in the disengaged position, so that the upper transmission gear 251a' will not drive in sync with the lower transmission gear 251b'.

Through the clutch, when the pull rod 233' is moving back and forth, when the gear rack 235' is traveling in one direction, the upper transmission gear 251a' through the clutch 410 automatically engages, driving the lower transmission gear 251b' to rotate coaxially, thereby activating the driven gear which activates the driven shaft 253' to rotate. When the gear rack 235' is moving in reverse direction, the clutch 410 is automatically disengaged, so that the upper transmission gear rotates in reverse direction, but the lower transmission gear 251b' still rotates in the original direction from inertia, thereby maintaining the effectiveness of the portable food processor. The way the clutch does it automatically makes the operation very convenient.

The said clutch 410 may also be arranged in the driven gear member 252' when it is needed, in which the toggle wheel 411 and the pawl 412 of the clutch 410 can be arranged in the region between the upper driven gear 252a' and the lower driven gear 252b'.

Figure 3:
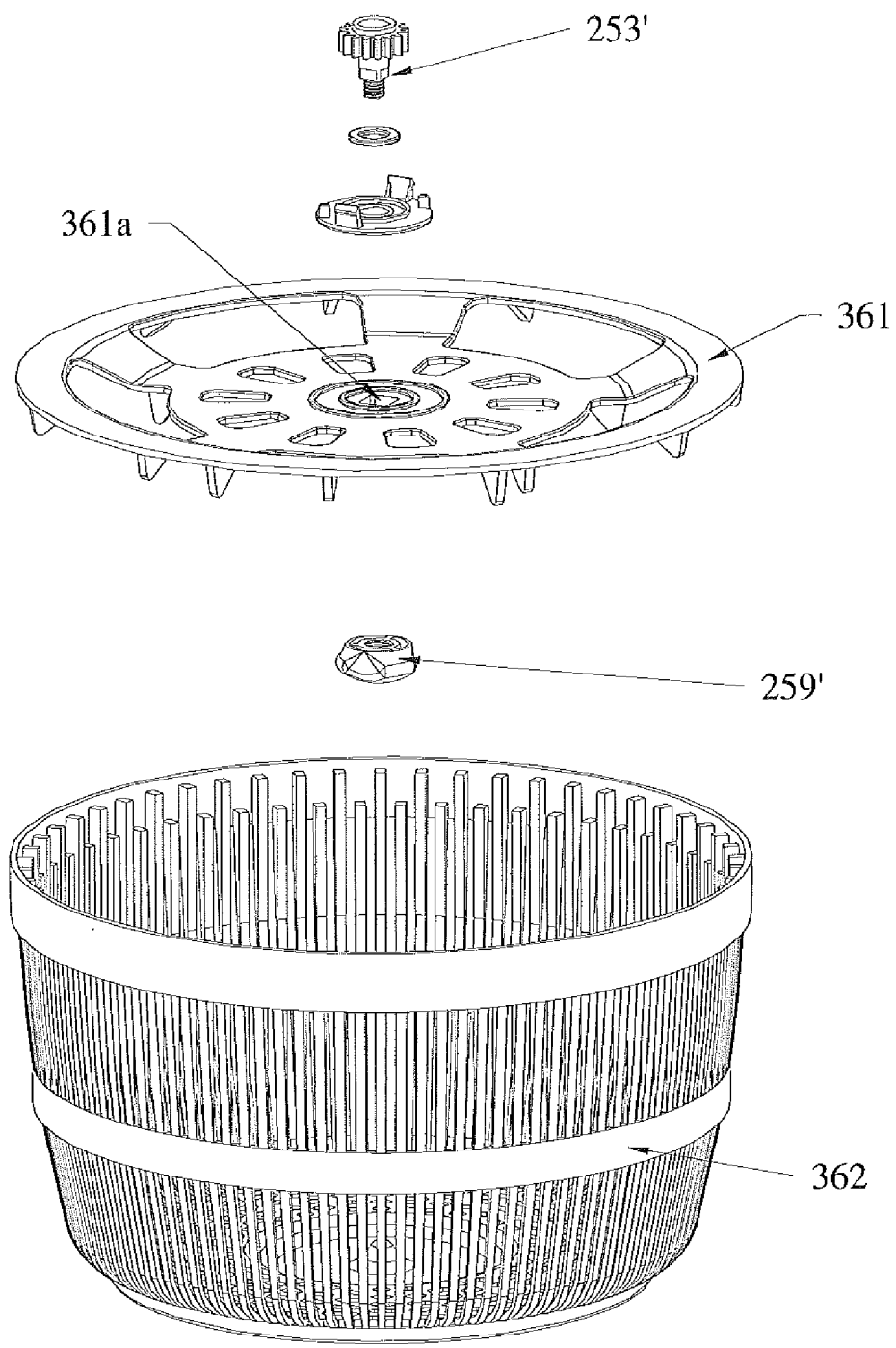
FIG. 3 shows an exploded view of the strainer basket of the said portable food processor of the present invention.
Figure 3A:
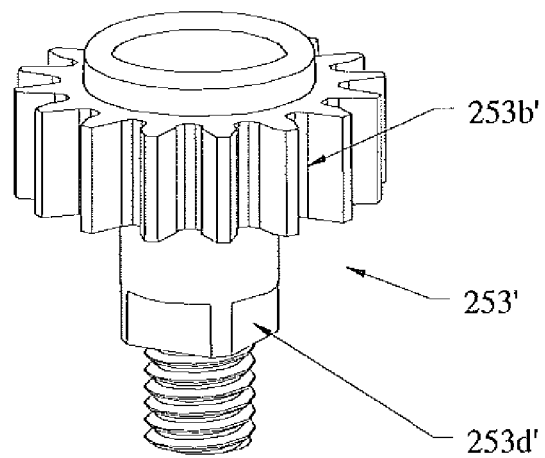
FIG. 3a shows a magnified view of the driven shaft of FIG. 3.

As shown in FIGS. 4 and 3a, in this embodiment, there is a shaft aperture 223' at the center of the lower shell 220' and the driven shaft 253' is rotationally mounted to the shaft aperture 223'. The bottom portion of the driven shaft 253' passes through the shaft aperture 223' and extends below the cover to correspond with the food processing member 300. There is a driven shaft gear member 253b' on the top of the driven shaft 253' that meshes with the lower driven gear 252b'. To ensure that the driven shaft can move freely in the lower shell, in this embodiment, there is a center aperture 224' in the center of the lower shell 220', a latch plate 258' at the center aperture 224', and a shaft aperture 223' in the center of the latch plate 258' that corresponds to the driven shaft and there are latch hooks 258a' around it. Correspondingly, there are latch apertures (not shown in the above figures) for the latch hooks 258a' near the center of the lower shell 220'. By inserting the latch hooks 258a' into the latch apertures at the bottom of the lower shell, the latch plate 258' is positioned in the center of lower shell 220'. To increase the inertia when the driven shaft 253' is rotating, a clump weight 254' can be mounted to the driven shaft 253' so that both rotate coaxially. The clump weight 254' can be directly positioned on the driven shaft, or alternatively positioned on the connecting shaft which rotates coaxially with the driven shaft. Specifically, as shown in FIGS. 3a and 4, the clump weight 254' is coupled to the driven shaft 253' and positioned between the driven shaft gear member and the shaft aperture 223' of the latch plate in this embodiment.

The food processing member 300 may consists of working members for different purposes, such as blade accessory, mixer accessory, etc. according to what processing is needed in the container 100', so that the food inside the container can be processed in various ways. In this embodiment the food processing member 300 will use the strainer basket member as an example for further explanation.

As shown in FIGS. 3 and 3a, in this embodiment, the said strainer basket member comprises the strainer basket cover 361 rotationally connected to the bottom of the driven shaft 253' and the strainer basket 362 rotationally positioned inside the food processor; the strainer basket cover is attached at the aperture of the strainer basket. Specifically, the strainer basket cover 361 and the strainer basket 362 may be locked together with a latch assembly. There is a center hole 361a in the center of the strainer basket cover 361, that corresponds to the tapped end 253d' at the bottom of the driven shaft 253', with a locking nut 259' at the bottom of the driven shaft. The center hole 361a of the strainer basket cover is placed over the tapped end 253d' of the driven shaft and the strainer basket cover 362 is secured to the lower end of the driven shaft 253' with the locking nut 259', so that the strainer basket cover 361 is positioned at the lower end of the driven shaft 253' and rotates coaxially with the driven shaft 253'. In the center of the bottom portion of the strainer basket 362 there is a concave part (not shown in the above figures) and there is a corresponding convex region (not shown in the above figures) on the bottom of the food processor. When the strainer basket is placed into the portable food processor, the driven shaft 253' passes through the strainer basket cover 361 to rotate the strainer basket 362 along the center axis, therefore dispelling the water from inside the strainer basket 362, succeeding in straining the water.

Figure 3B:
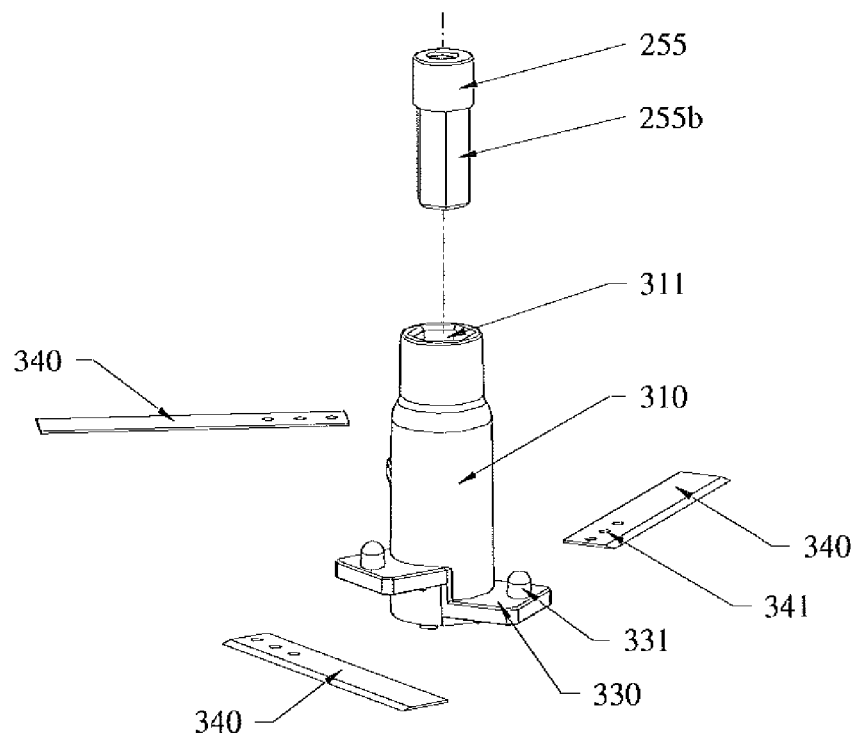
FIG. 3b shows an exploded view of the cutting member of the said portable food processor of the present invention.
Figure 10:
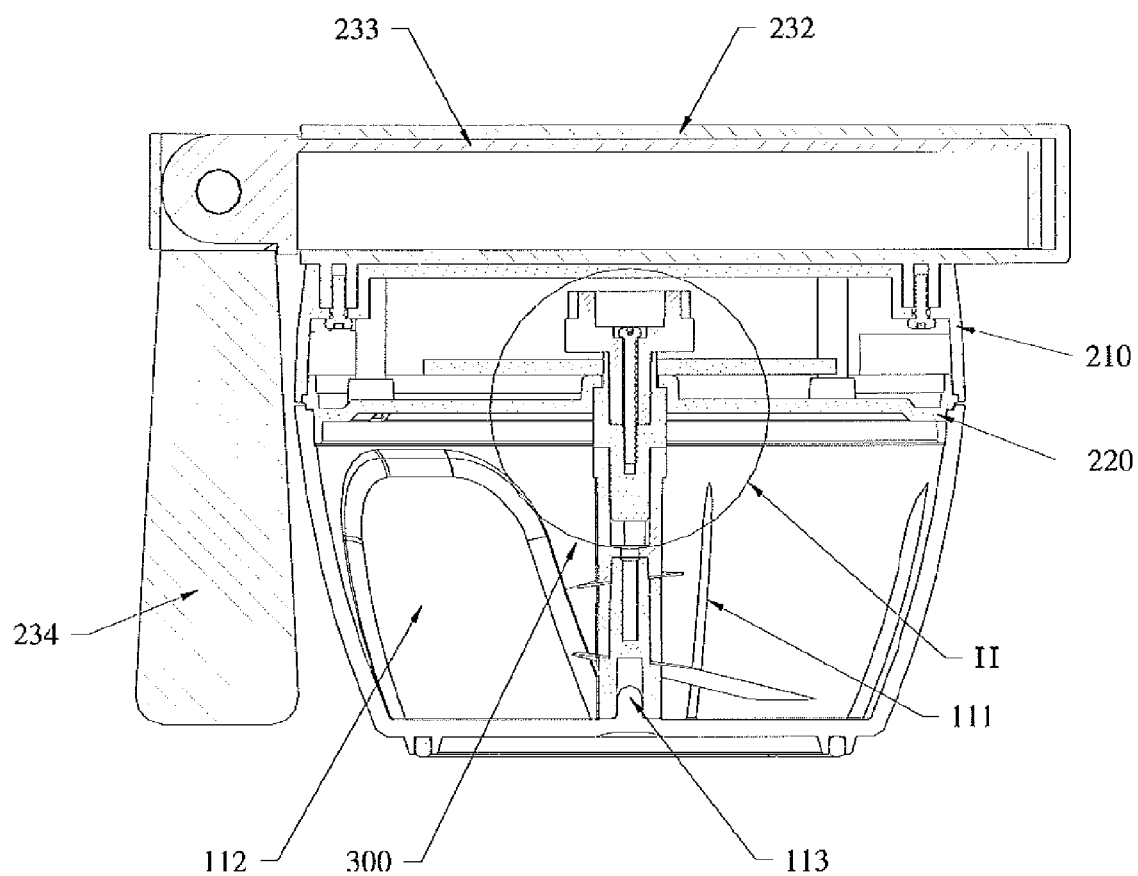
FIG. 10 shows a sectional view of the second embodiment of the said portable food processor of the present invention.
Figure 10A:
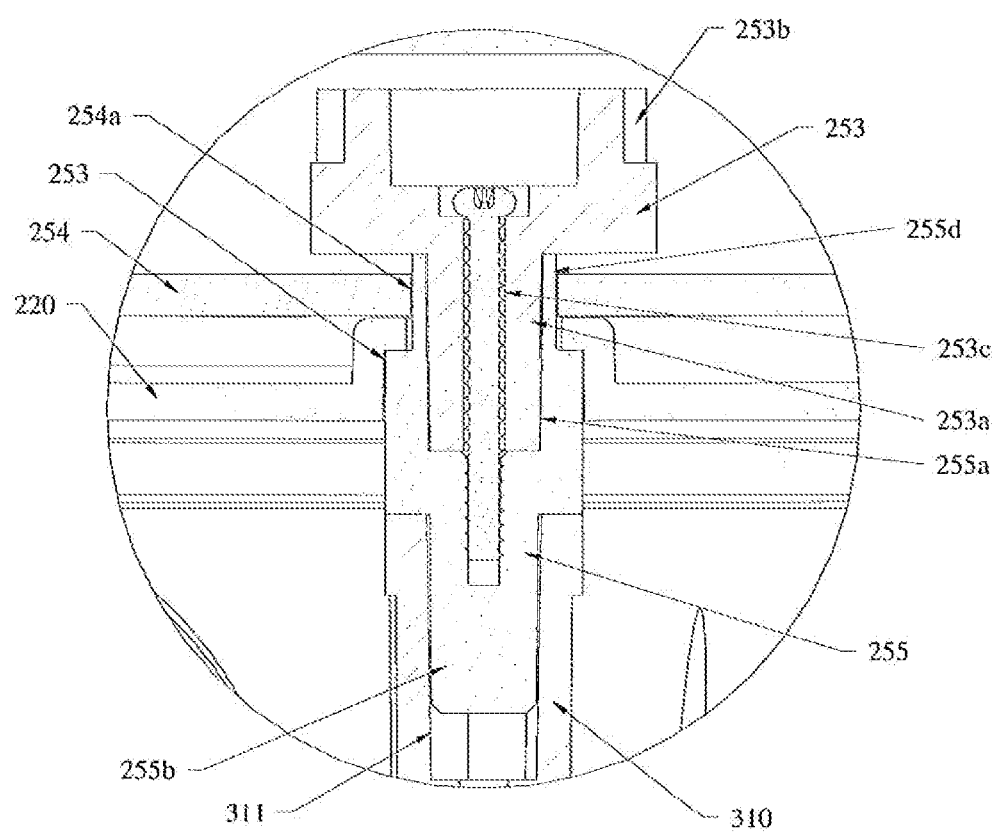
FIG. 10a is a magnified view of Part II of FIG. 10.
Figure 11:
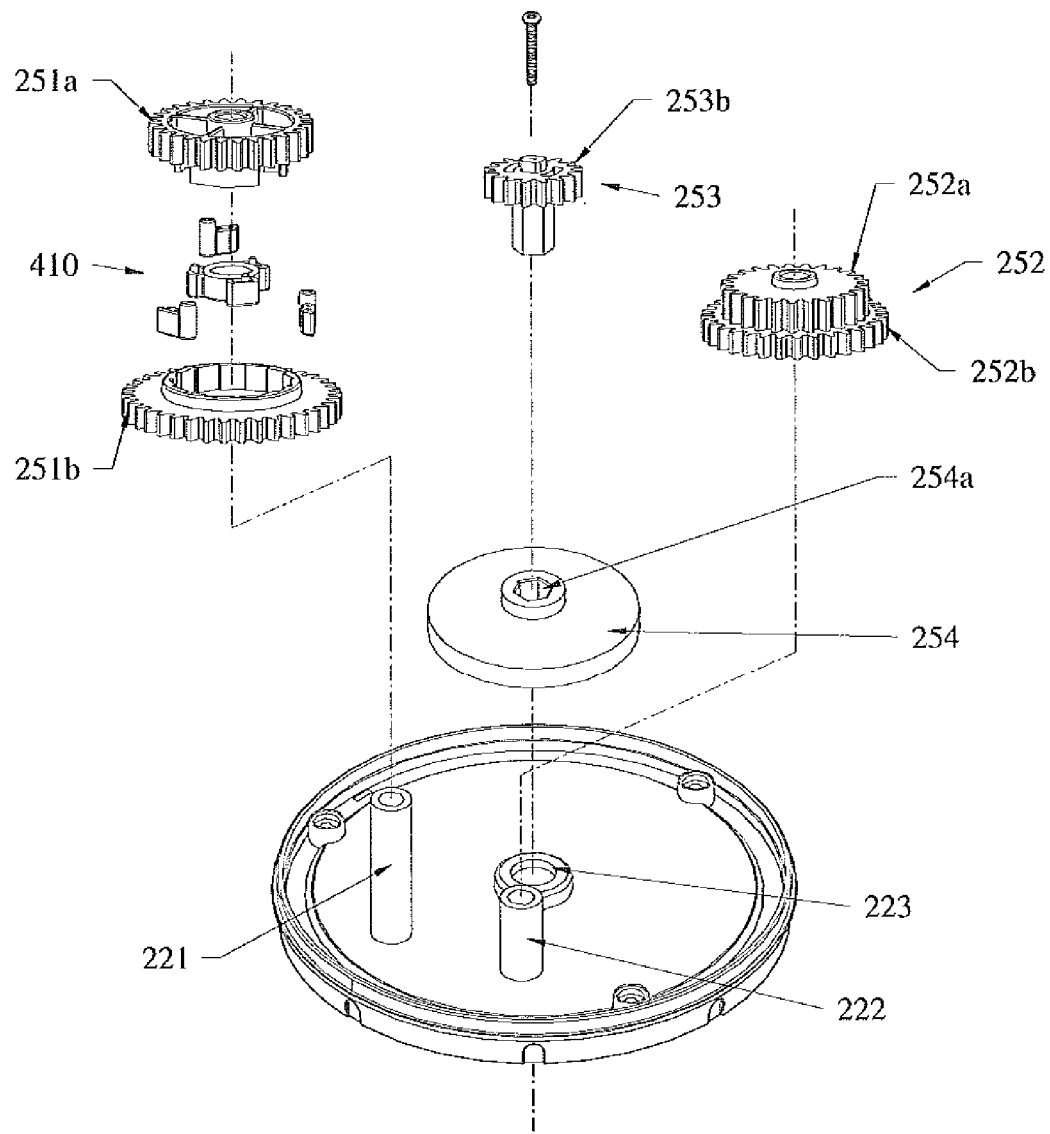
FIG. 11 shows an exploded view of the transmission device of the second embodiment of the said portable food processor of the present invention.

In this embodiment, the food processing member 300 is not limited to the strainer basket member; another working member to consider is the blade assembly. As shown in FIGS. 1 and 3b, in this embodiment, the blade assembly of the portable food processor of the present invention comprises the connecting shaft 255 which coaxially couples to the bottom of the driven shaft, the center shaft 310 that is coaxially coupled to the bottom of the connecting shaft, and the blades 340 that are installed on the center shaft. As such, the top of the connecting shaft is coaxially coupled to the bottom of the driven shaft; that is the connecting shaft is rigidly connected to the driven shaft, specifically, to arrange a screw hole on the top of the connecting shaft 255 that corresponds to the bottom part of the driven shaft. There is a first center aperture 311 on the top of the center shaft 310 that corresponds to the bottom portion of the connecting shaft 255. It is preferable that the lower part of the connecting shaft 255 is a hexagonal column 255b, the first center aperture 311 is a hexagonal shape hole that corresponds to the connecting shaft 255, so that the driven shaft 253' through the connecting shaft 255 drives the center shaft 310 to rotate coaxially. There is an aperture (not shown in the above figures) at the bottom of the center shaft 310 and there is a convex element 113 (see FIG. 10) at the inside bottom of the container 100 below the connecting shaft 255. The aperture at the bottom of the center shaft corresponds to the convex element 113, this positions the center shaft 310 rotationally connected to the bottom of the container 100. If it is required by the user, the driven shaft can directly couple to the top of the center shaft, so that the driven shaft directly rotates the center shaft coaxially.

Around the center shaft 310, there are connection plates 330. The connection plates 330 extend out from the shaft column radially and have positioning convex member 331 on the connection plates 330 that correspond to an end of the blades 340 that has position holes 341. Screws or similar fasteners can be used to secure the blades 340 onto the connection plates 330, so that the blades 340 will rotate around the center shaft 310. According to need, there can be additional blades 340. The blades distribute circumferentially on the center shaft column and when the center shaft is activated the blades rotate around the center shaft chopping up the food that is inside the container.

As shown in FIGS. 7, 8, 8a, and 9a, in the second embodiment of the portable food processor of the present invention, the portable food processor includes the container 100, container cover member 200 and the food processing member 300 within the container 100. As such, the container cover member 200 includes the cover that closes the aperture of the container 100, the pull rod member 230 that protrudes on top of the cover, and the transmission device 250 that is arranged in the cover. The pull rod member 230 rotates the food processor member 300 relative to the container 100 through the transmission device 250 and the spinning of the food processing member 300 relative to the container 100 allows the draining, cutting up or mixing of the food.

Figure 8:
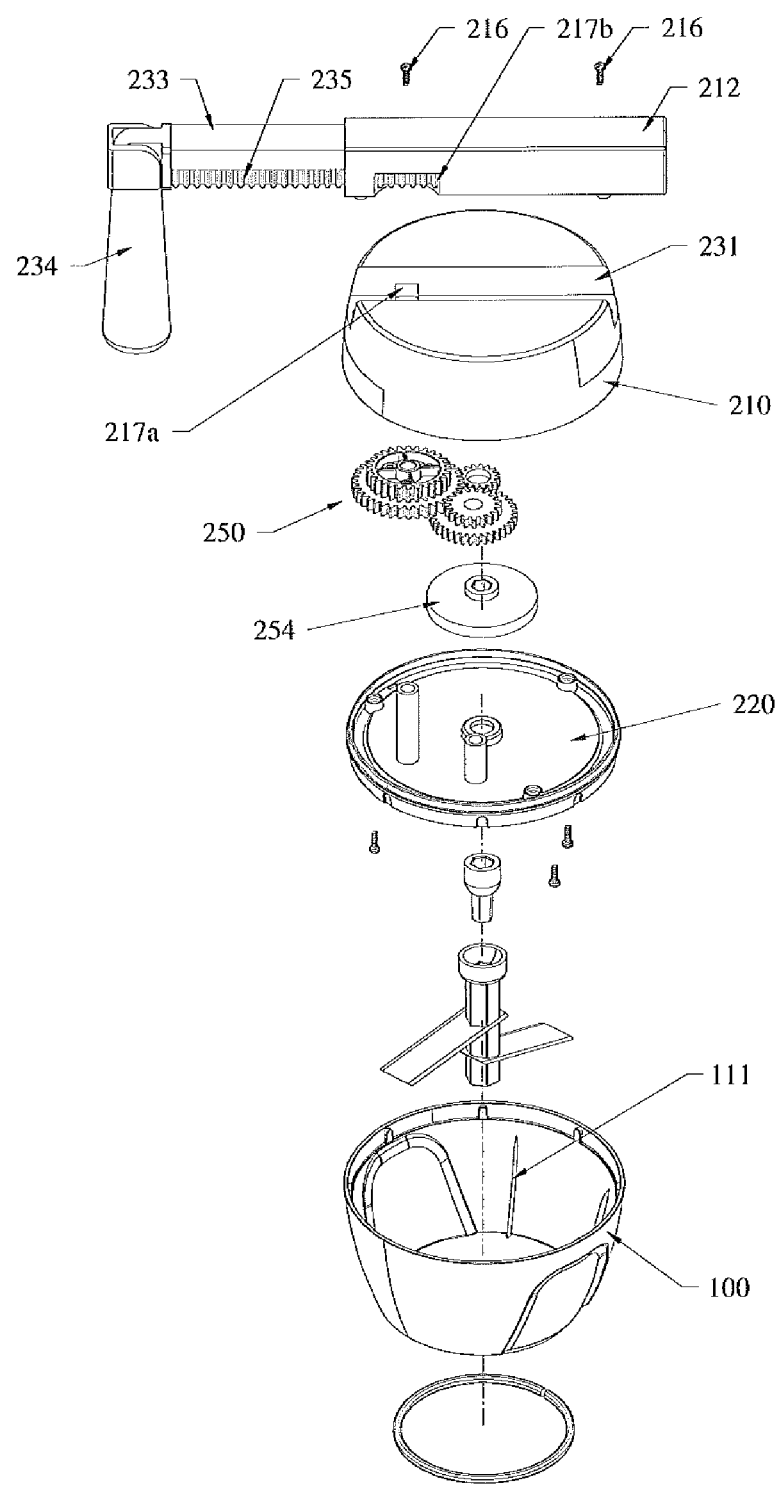
FIG. 8 shows an exploded view of the second embodiment of the said portable food processor of the present invention.
Figure 9:
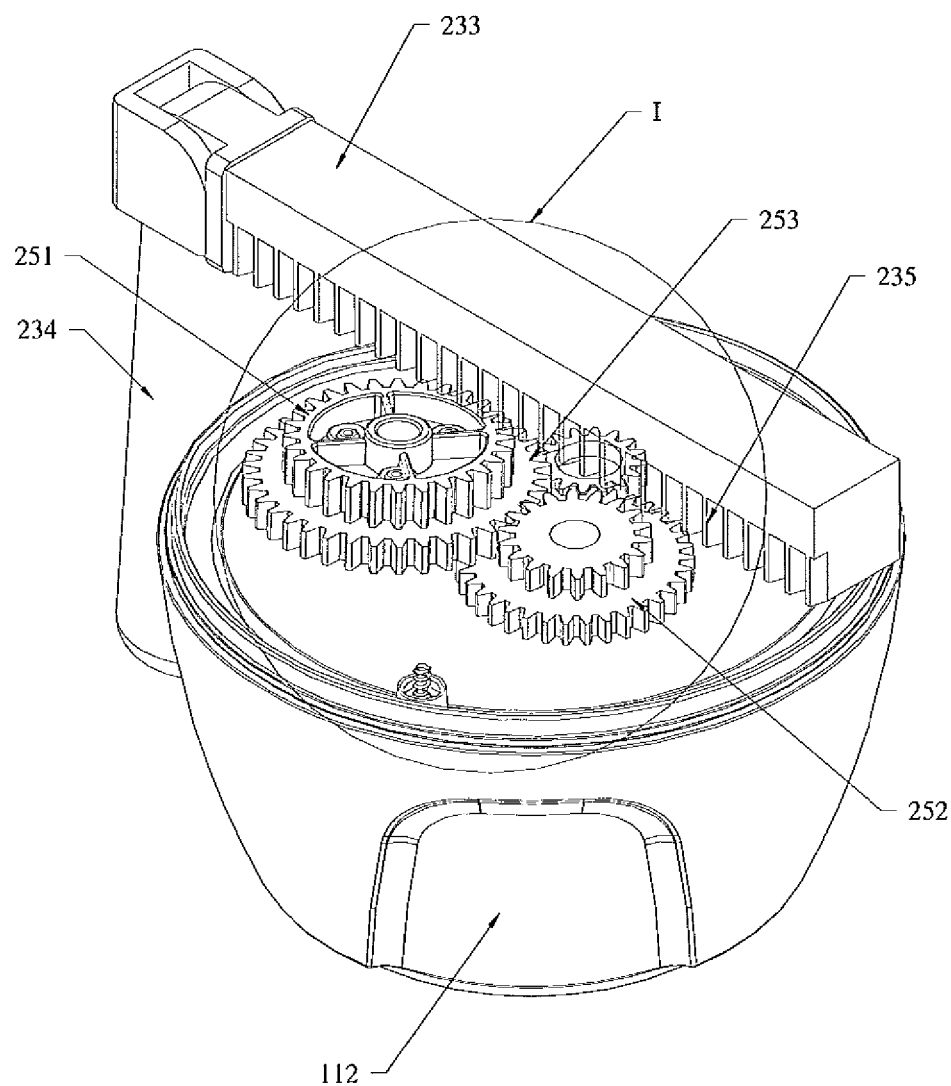
FIG. 9 shows a three-dimensional view of the second embodiment of the said portable food processor of the present invention without the cover member.
Figure 9A:
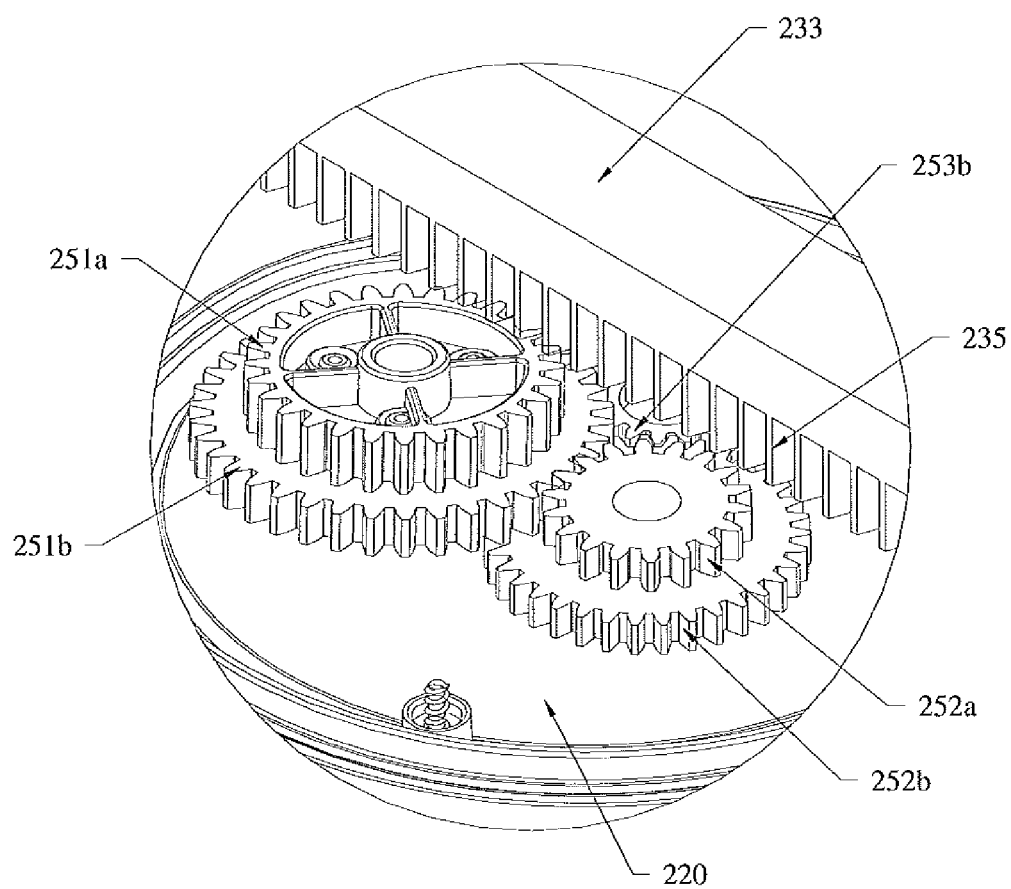
FIG. 9a is a magnified view of Part I of FIG. 9.

As shown in FIGS. 8, 9 and 9a, in this embodiment, the cover is assembled from the upper shell 210 and the lower shell 220. The upper shell 210 and the lower shell 220 are securely mounted together by screws or equivalent fasteners, and the cavity between the upper shell 210 and the lower shell 220 is where the transmission device 250 can then be placed. The lower shell 220 fits onto the aperture of the container 100, so that the lower shell 220 covers the aperture of the container 100.

The pull rod member comprises the sliding track 231 on the top surface (the top of the container cover member 200) of the upper shell 210, the sliding track cover 232, and the pull rod 233. The sliding track cover 232 and the sliding track 231 correspond on the top of the upper shell 210 to form the gear rack, the pull rod 233 corresponds with the gear rack, so that the pull rod 233 can move back and forth inside the gear rack on a level plane. Specifically, the sliding track cover is arranged on the top surface of the upper shell 210 with screw 216. Preferably, when holding a handle 234 and moving the pull rod 233 horizontally, the handle 234 and the pull rod 233 are rotationally connected by a shaft, it is preferable for the shaft to be perpendicular to the direction of the pull rod when it is moving but within the same level plane, this way when pulling on the handle 234 on the level plane, the handle 234 and pull rod 233 can rotate a little, so that the operation is not all stiff, and the action a little lively. One side surface of the pull rod 233 has gear rack 235 that meshes with the gear of the driving gear member, so that the pull rod 233 can drive the driving member to rotate the portable food processing member.

As shown in FIGS. 8, 9 and 9a, the transmission device 250 comprises the driving gear member 251, driven gear member 252, and the driven shaft 253. As such, there is a first positioning rod 221 located on the top and near the side of the lower shell 220 close to the edge of the upper shell, the center of the driving gear member 251 has a screw hole, the driving gear member 251 is fixed in position on the first positioning rod 221 through this screw hole by a screw, so the driving gear member 251 is positioned on top and near the side of the lower shell 220 close to the edge of the upper shell, therefore the driving gear member can be positioned in the cavity between the upper and lower shells 210, 220. The driving gear member 251 has the upper transmission gear 251a and the lower transmission gear 251b, the upper transmission gear 251a meshes with the gear rack 235 on the side of the pull rod 233, the lower transmission gear 251b meshes with the driven gear member 252.

There is a second positioning rod 222 located on the top and near the side of the lower shell 220 close to the edge of the upper shell 210, can also have a screw hole at the center of the driven gear member 252, the driven gear member 252 is fixed in position on the second positioning rod 222 through this screw hole by a screw, so the driven gear member 252 is positioned on top and near the side of the lower shell 220 close to the edge of the upper shell, therefore the driven gear member 252 can be positioned in the cavity between the upper and lower shells 210, 220. The driven gear member 252 has the upper driven gear 252a and the lower driven gear 252b that rotate in sync on the same shaft, the upper driven gear 252a meshes with the lower transmission gear 251b, and the lower driven gear 252b meshes with the driven shaft gear member 253b which is on top of the driven shaft.

As shown in FIG. 8, inside the sliding track 231 of the upper shell, there are apertures 217a and 217b in the corresponding sliding track wall and sliding track cover 232, this allows the upper transmission gear 251a that is in the cavity between the upper and lower shells 210, 220 to access and mesh with the gear rack 235 on the pull rod that is inside the gear rack of the sliding track. When the pull rod 233 moves, the gear rack 235 on the side of the pull rod 233 meshes with the upper transmission gear 251a of the drive gear assembly, in turn rotating the drive gear assembly; the lower transmission gear 251b of the driving gear member meshes with the upper driven gear 252a of the driven gear member, in turn rotating the driven gear member 252; the lower driven gear 252b of the driven gear member meshes with the driven shaft gear member 253b on the top of the driven shaft, in turn rotating the driven shaft 253, thereby turning the food processing member 300.

To ensure the driven shaft 253 only rotating in one direction when the pull rod 233 is moved back and forth, preferable to install a clutch 410 in the transmission device, the configuration of the clutch can be the same as in the first embodiment.

In this embodiment, there is shaft aperture 223 located at the center of the lower shell 220; the driven shaft 253 is rotationally connected at the shaft aperture 223. The bottom portion of the driven shaft 253 passes through the shaft aperture 223 and extends below the cover to correspond with the food processing member, there is a driven shaft gear member 253b on the top of the driven shaft 253 that meshes with the lower driven gear 252b.

Figure 12:
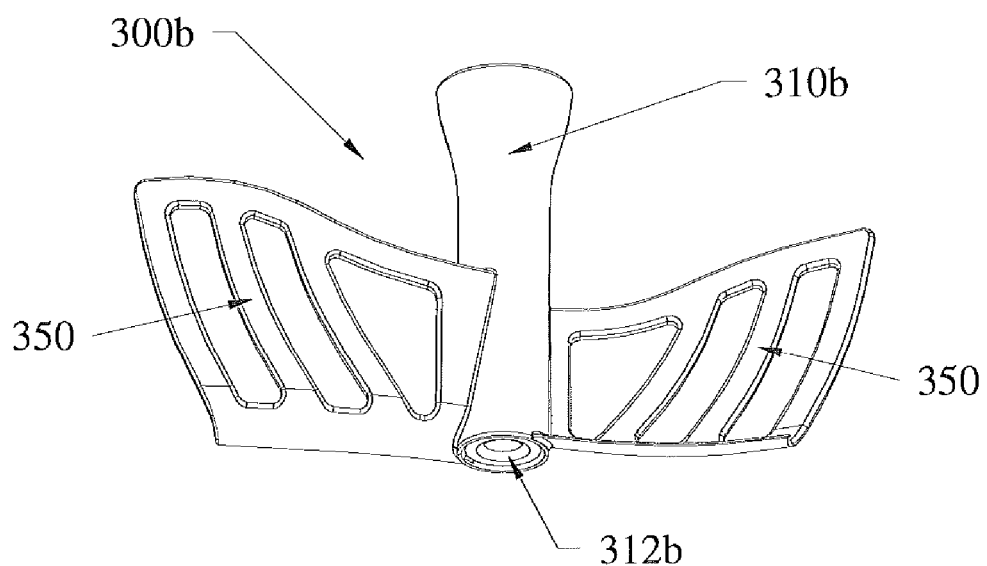
FIG. 12 shows a structural view of the blades of the said portable food processor of the present invention.

In the present invention, the food processing member 300 may consists of working members for different purposes, such as blade accessory, mixer accessory, etc. according to what processing is needed to select from the different working member to use in the container 100, so that the food inside the container can be processed in various ways. In this embodiment the food processing member 300 will use the mixer accessory as an example for further explanation. As shown in FIG. 12, the mixer accessory 300b comprises the center shaft 310b and two blades 350; one edge of the blade 350 is attached to the surface of the center shaft 310b circumferentially, the blade 350 can be manufactured as one with the center shaft 310b or securely attach to the center shaft 310b by other means. There is a center hole (not shown in the above figures) on the top of the center shaft 310b which corresponds to the bottom of the driven shaft 253, so that the driven shaft can drive the center shaft to rotate coaxially with the driven shaft. If the bottom of the driven shaft follows the first embodiment as a threaded portion, then the center aperture would be a screw hole; if the bottom of the driven shaft is hexagon in shape with tapped end, then the center aperture will need to match the hexagonal shape of the tapped end; can follow the example of blade accessory in the first embodiment, by adding a connecting shaft between the driven shaft and the center shaft, so that the driven shaft turns the center shaft to rotate coaxially. There can be an aperture 312b located at the bottom of the center shaft which corresponds to the convex element in the inner bottom of the container 100. In use, the driven shaft turns the center shaft to rotate, the blade 350 rotates around the center shaft 310b, thereby mixing the food inside the container 100, succeeding in the purpose of mixing the food.

In order to increase inertia to the rotation of the driven shaft 253, clump weight 254 can be added that turns in sync with the driven shaft 253 on the driven shaft 253. Specifically, as shown in FIGS. 8, 10, 10a, and 11, referring to the second embodiment, it is preferable to use a disc shape clump weight 254, it is highly recommended to use a high density material for its construction, to increase inertia. There is a hexagonal shape connecting hole 255a on the top of the connecting shaft 255, the bottom of the driven shaft has a corresponding hexagonal rod 253a to the connecting aperture 255a and the top of the driven shaft has a through hole 253c, the screw passes through the through hole 253c of the driven shaft to screw into the top threaded portion of the connecting shaft 255, this mounts the driven shaft 253 and the connecting shaft 255 in place and positions one on the top and one on the bottom of the lower shell 220, and the connecting aperture 255a of the connecting shaft corresponds to the post 253a of the driven shaft thereby limiting any movement between the driven shaft 253 and the connecting shaft 255, this way it is possible to fix the clump weight on the driven shaft, the driven shaft 253 via the connecting shaft 255 rotates the food processing member. If it is required by the user, the connecting aperture 255a and the post 253a can be of a polygon or a specialized shape, as long as it can eliminate any movement between the driven shaft 253 and the connecting shaft 255. The clump weight is mounted on the same axis as the connecting shaft 255, specifically, there is a hexagon shape shaft shoulder 255d at the top of the driven shaft and upper edge of the lower shell, there is a hexagon shape center aperture 254a at the center of the clump weight that corresponds to the shaft shoulder 255d, therefore the clump weights rotates in sync with the driven shaft 253, can vary the inertia when the driven shaft rotates. Similarly, as in the first embodiment, the clump weight can also be attached on the same axis at the lower part of the driven shaft.

In the embodiment above, it is possible to install the first convex element 111 (see FIG. 10) on the inner surface of the container 100 as well as along the axis line, that is the first convex element 111 goes from the top of the inner wall of the container 100 along the inner wall surface towards the bottom, this first convex element 111 can increase the friction between the food and the food processing member 300 when the food processing member 300 is rotating; so that the food will be chopped up more efficiently. The first convex element 111 can increase to four or more. In the embodiment above, two concave regions 112 can be installed on the outside surface of the container 100, these two concave regions 112 evenly spaced on the surface of the container 100, to make it convenient to hold onto the container 100 when it is being used, so that the container 100 stays in place, and the user can use the other hand to activate the pull rod member 230, to operate the food processor. Furthermore, with the two concave regions 112, the user can switch hands to operate, leading to higher efficiency in processing the food. In this embodiment, the two concave regions 112 becomes a concave region inside the container 100, these concave region 112 in a way increases the friction to the food being processed inside the container 100. The said four convex elements 111 can be divided into two groups; each group includes two of the convex elements, the convex elements of each group uses the concave region 112 as the center to space evenly apart, that is the two convex elements are evenly spaced on either side of the each concave region 112.

The above embodiments only provide several implementations of the embodiments of the present invention. The explanation of the implementations is comparatively detailed and specific. However, this should not be viewed as the limitation of the scope of the present invention. Also keep in mind that an average skilled technician in the field of the relevant technology can come up with many modifications and embodiments based on the idea of the present invention. These should all be protected under the scope of the present invention. Thus, the scope of protection of the present invention should be based on the claims of this specification.

The invention claimed is:

1. A portable food processor comprising a container for receiving food, a food processing member being mounted inside the said container configured to be rotated relative to the said container and a container cover member covered and mounted to an aperture of the said container, the said container cover member comprises a cover, a driving member mounted on the top of the said cover and a transmission device being mounted inside the said cover, the said transmission device is configured to be driven by the said driving member and then drive the said food processing member be rotated relative to the said container, wherein the said driving member is a pull rod member, the pull rod member comprises a sliding track arranged at the top of the said cover and the said pull rod being mounted inside the said sliding track, said sliding tracking defining a horizontal plane, the said pull rod comprises a gear rack which is configured to mesh with gear and gear rack of the said transmission device, the said transmission device comprises a driving gear member, a driven gear member, a driven shaft and a clump weight;

an outer surface of a first portion of the said driven shaft comprises a plurality of planar surface;

a second portion of the driven shaft is mounted with a driven shaft gear member;

the said clump weight is mounted to the first portion of the said driven shaft;

the said clump weight and the said driven shaft are configured to be rotated coaxially;

the said clump weight comprises a clump weight aperture;

the said transmission device comprises the upper transmission gear and the lower transmission gear which are configured to be rotated coaxially;

the said upper transmission gear is configured to be meshed with the said gear rack of the said pull rod member;

the said lower transmission gear is configured to be meshed with the said driven gear member;

the diameter of the said upper transmission gear is less than the diameter of the said lower transmission gear;

the said driven gear member comprises an upper driven gear and a lower driven gear which are configured to be rotated coaxially;

the said upper driven gear is configured to be meshed with the said lower transmission gear;

the said lower driven gear is configured to be meshes with the said driven shaft gear member;

the diameter of the said upper driven gear is less than the diameter of the said lower driven gear;

the diameter of the said driven shaft gear member is less than the diameter of the said lower driven gear;

a clutch is arranged between the said upper transmission gear and the said lower transmission gear; and the central axis of the said container is being formed between the axis of the said driven shaft and the center of the base of the said container.

2. The portable food processor according to claim 1, wherein a handle is rotationally mounted to an end of the said pull rod, the said handle and the said pull rod are rotationally mounted together through a shaft.

3. The portable food processor according to claim 2, wherein the said handle is positioned vertically to said horizontal plane of said sliding track.

4. The portable food processor according to claim 1, wherein an elastic member being elongated when pulling and returned to its original position when relaxing is mounted between an other end of the said pull rod and the said cover.

5. The portable food processor according to claim 4, wherein the said handle is T-shaped, the said T-shaped handle comprises the upper handle shell and the lower handle shell which are mounted together, a pair of corresponding convex element and concave element are arranged between the said upper handle shell, the said lower handle shell and the said pull rod.

6. The portable food processor according to claim 4, wherein the said pull rod further comprises a connecting rod, the said handle is rotationally mounted to a D-shaped handle of the said connecting rod.

7. The portable food processor according to claim 1, wherein first and second positioning rods are mounted inside the said cover, the said driving gear member is mounted on the said first positioning rod; the said driven gear member is mounted on the said second positioning rod; the said driven shaft is rotationally mounted to the center portion of the said cover; the said driving gear member being rotationally mounted within the said cover is meshed with the said gear rack and the said driven gear member respectively; the said driven gear member being rotationally mounted inside the said cover is meshed with the said driving gear member and the said driven shaft gear member which is mounted to an upper end of the said driven shaft respectively; the said driven shaft is extended from a bottom portion of the said container cover member by passing through a shaft hole and is drivingly mounted to the said food processing member.

8. The portable food processor according to claim 7, wherein the said driving gear member comprises an upper transmission gear configured to be meshed with the said gear rack of the said pull rod and a lower transmission gear configured to be meshed with the said driven gear member, the said upper transmission gear and the said lower transmission gear are both mounted on the said first positioning rod and rotated coaxially.

9. The portable food processor according to claim 8, wherein the said clutch is arranged between the said upper transmission gear and the said lower transmission gear, the said clutch comprises a pawl being rotated coaxially with the said upper transmission gear is mounted on an end surface of the said upper transmission gear, a ratchet groove is mounted to an end surface of the said lower transmission gear, a toggle wheel being engaged or disengaged from the said ratchet groove by toggling the said pawl is coaxially mounted to the said upper transmission gear.

10. The portable food processor according to claim 9, wherein the said toggle wheel and the said upper transmission gear are coaxially mounted, corresponding convex element and curved concave element are arranged between the said toggle wheel and the said upper transmission gear, the said pawl and the said ratchet groove are configured to be engaged or disengaged through sliding movement of the said convex element along the said curved concave element.

11. The portable food processor according to claim 7, wherein the said driven shaft comprises a clump weight configured to be rotated coaxially with the said driven shaft.

12. The portable food processor according to claim 1, wherein the said food processing member is a strainer basket member comprising a strainer basket cover coaxially rotationally mounted to the lower end of the said driven shaft and a strainer basket rotationally positioned within the said container, the said strainer basket cover is attached on the aperture of the said strainer basket.

13. The portable food processor according to claim 1, wherein the said food processing member comprises a center shaft arranged in the said container and a working member mounted to the said center shaft, the lower end of the said center shaft is rotationally mounted to the bottom of the said container, the upper end of the said center shaft is being coaxially rotated which is driven by the said driven shaft.

14. The portable food processor according to claim 13, wherein the said center shaft comprises at least one connecting plate mounted to the outer wall of the said center shaft, the said working member is a blade mounted to the said connecting plate.

15. The portable food processor according to claim 13, wherein the said working member is at least one blade for mixing food and is mounted to the outer wall of the said center shaft.

16. The portable food processor according to claim 1, wherein the inner wall of the said container comprises at least one first convex element for increasing the friction between the food and the said food processing member extended from the top of the said container towards the bottom of the said container.

17. The portable food processor according to claim 1, wherein the said container further comprises at least one concave region for being held by the user mounted to the outer wall of the said container.

* * * * *